(12) United States Patent
Shen et al.

(10) Patent No.: US 11,706,097 B2
(45) Date of Patent: Jul. 18, 2023

(54) TASK PROCESSING METHOD APPLIED TO NETWORK TOPOLOGY, ELECTRONIC DEVICE AND STORAGE MEDIUM

(71) Applicant: Novnet Computing System Tech Co., Ltd., Beijing (CN)

(72) Inventors: Yushi Shen, Sichuan (CN); Congchong Ru, Sichuan (CN); Chuanjun Ma, Sichuan (CN); Zhengbin Yao, Sichuan (CN)

(73) Assignee: Novnet Computing System Tech Co., Ltd., Beijing (CN)

( * ) Notice: Subject to any disclaimer, the term of this patent is extended or adjusted under 35 U.S.C. 154(b) by 0 days.

(21) Appl. No.: 17/794,457

(22) PCT Filed: Jan. 22, 2021

(86) PCT No.: PCT/CN2021/073405
§ 371 (c)(1),
(2) Date: Jul. 21, 2022

(87) PCT Pub. No.: WO2021/148014
PCT Pub. Date: Jul. 29, 2021

(65) Prior Publication Data
US 2023/0053663 A1    Feb. 23, 2023

(30) Foreign Application Priority Data

Jan. 23, 2020 (CN) .......................... 202010076228.4
Jan. 23, 2020 (CN) .......................... 202010076231.6

(51) Int. Cl.
*G06F 15/173* (2006.01)
*H04L 41/12* (2022.01)
(Continued)

(52) U.S. Cl.
CPC .......... *H04L 41/12* (2013.01); *H04L 43/0852* (2013.01); *H04L 43/106* (2013.01)

(58) Field of Classification Search
CPC ....................................................... H04L 41/12
(Continued)

(56) References Cited

U.S. PATENT DOCUMENTS

2019/0220205 A1    7/2019  Alluboyina et al.
2019/0312772 A1*  10/2019  Zhao ................... H04L 41/5051

FOREIGN PATENT DOCUMENTS

CN         1588898 A     3/2005
CN       101351784 A     1/2009
(Continued)

OTHER PUBLICATIONS

CN202010076228.4 first office action.
CN202010076231.6 first office action.

*Primary Examiner* — Hee Soo Kim
(74) *Attorney, Agent, or Firm* — IPro, PLLC

(57) ABSTRACT

A task processing method includes: acquiring target data and target algorithm required by a target task to be executed; acquiring from a network topology at least one first-type node capable of providing the target data and at least one second-type node capable of executing the target algorithm; selecting, from the at least one first-type node, a node that provides one set of target data as a first target node, and selecting, from the at least one second-type node, a node that provides one set of target algorithm as a second target node; and controlling the second target node to process the target data in the first target node by using the target algorithm.

8 Claims, 5 Drawing Sheets

(51) Int. Cl.
 *H04L 43/0852* (2022.01)
 *H04L 43/106* (2022.01)
(58) Field of Classification Search
 USPC .......................................................... 709/223
 See application file for complete search history.

(56) References Cited

FOREIGN PATENT DOCUMENTS

| | | | |
|---|---|---|---|
| CN | 101729387 A | 6/2010 | |
| CN | 101834802 A | 9/2010 | |
| CN | 103309738 A | 9/2013 | |
| CN | 104731647 A | 6/2015 | |
| CN | 105453492 A | 3/2016 | |
| CN | 105893497 A | 8/2016 | |
| CN | 106161275 A | 11/2016 | |
| CN | 106611013 A | 5/2017 | |
| CN | 108255864 A | 7/2018 | |
| CN | 109918184 A | 6/2019 | |
| CN | 110546640 A | 12/2019 | |
| CN | 110928692 A | 3/2020 | |
| CN | 110928694 A | 3/2020 | |
| CN | 110932972 A | 3/2020 | |
| CN | 111444017 A | 7/2020 | |
| WO | WO-2018121738 A1 * | 7/2018 | ........... H04N 21/234 |

\* cited by examiner

TASK PROCESSING METHOD APPLIED TO NETWORK TOPOLOGY, ELECTRONIC DEVICE AND STORAGE MEDIUM

CROSS-REFERENCE TO RELEVANT APPLICATIONS

This application claims priority to the Chinese patent application No. 202010076228.4 entitled "TASK PROCESSING METHOD AND APPARATUS, AND ELECTRONIC DEVICE" filed on Jan. 23, 2020, and the Chinese patent application No. 202010076231.6 entitled "DATA TRANSMISSION METHOD AND APPARATUS, AND ELECTRONIC DEVICE" field on Jan. 23, 2020, to the CNIPA, China National Intellectual Property Administration, the entire contents of which are incorporated herein by reference.

TECHNICAL FIELD

The present application relates to the technical field of communication technology, and more particularly, to a task processing method and apparatus, and an electronic device.

BACKGROUND

With the rapid development of the Internet, there are more and more data in the Internet. Currently, in the network architecture, distributed storage is used for data, i.e., data is stored in different nodes. When a certain target node needs to perform a certain task, nodes in the network that can provide the data required by the task may be searched, and then relevant data are read from these nodes, so that the target node performs some algorithm processing on the read data.

Therefore, in the prior art, all the data required by the target node to perform the task are collected before the data are processed. When a large amount of data and complex algorithms are needed to complete this task, the target node is required to have strong capabilities and extend to the whole network topology, which increases the cost of constructing the network topology.

SUMMARY

The present application provides a task processing method and apparatus, and an electronic device so as to solve the problem of increase in design costs of the entire network topology when a task that needs to be completed involves a large amount of data, and the node that executes the task is required to have strong capabilities.

In a first aspect, the embodiments of the present application provide a task processing method applied to a network topology, wherein the network topology includes a plurality of nodes. The task processing method includes:

acquiring target data and target algorithm required by a target task to be executed;

acquiring from the network topology at least one first-type node capable of providing the target data and at least one second-type node capable of executing the target algorithm;

selecting, from the at least one first-type node, a node that provides one set of target data as a first target node, and selecting, from the at least one second-type node, a node that provides one set of target algorithm as a second target node; and controlling the second target node to process the target data in the first target node by using the target algorithm.

In a second aspect, the embodiments of the present application also provide a task processing apparatus applied to a network topology, wherein the network topology includes a plurality of nodes. The task processing apparatus includes:

a first acquisition module configured for acquiring target data and target algorithm required by a target task to be executed;

a second acquisition module configured for acquiring from the network topology at least one first-type node capable of providing the target data and at least one second-type node capable of executing the target algorithm;

a selection module configured for selecting, from the at least one first-type node, a node that provides one set of target data as a first target node, and selecting, from the at least one second-type node, a node that provides one set of target algorithm as a second target node; and a control module configured for controlling the second target node to process a received first data packet of the target data sent by the first target node by using the target algorithm.

In a third aspect, the embodiments of the present application also provide an electronic device, including a processor, a storage and a computer program stored in the memory and executable on the processor, wherein the computer program, when executed by the processor, implements the steps of the task processing method above.

In a fourth aspect, the embodiments of the present application provide a computer program, including a computer-readable code that, when executed on a computing-processing device, causes the computing-processing device to execute the task processing method above.

In a fifth aspect, the embodiments of the present application also provide a computer-readable storage medium stored with the computer program above.

According to the task processing method provided by the embodiments of the present application, by acquiring the target data and the target algorithm required by the target task to be executed, and determining the at least one first-type node capable of providing the target data and the at least one second-type node capable of executing the target algorithm in the network topology, one first-type node and one second-type node are selected, and the selected second-type node is controlled to process the target data provided by the selected first-type node by using the target algorithm, so as to execute the target task. It follows that, according to the embodiments of the present application, the data and the algorithm are distributed to the network respectively, instead of uniformly storing the data to the node that needs to perform the target task, or executing the target algorithm by the node that needs to execute the target algorithm, but are distributed to the node with the processing capability of the target algorithm to execute, that is, the embodiments of the present application combine distributed storage with distributed computing, which can reduce the capability of a single node in the network topology, thereby reducing the design cost of the single node, and further reducing the design cost of the whole network topology.

The above description is only a summary of the technical solutions of the present application. To understand the technical means of the present application more clearly so that the present application can be implemented according to the contents of the specification, and to make one of the above and other objects, features and advantages of the present application more obvious and understandable, the specific embodiments of the present application are specially illustrated hereinafter.

BRIEF DESCRIPTION OF THE DRAWINGS

In order to illustrate the technical solutions in the embodiments of the present application or the prior art in a clearer manner, the drawings desired in the description of the embodiments or the prior art will be described briefly hereinafter.

DETAILED DESCRIPTION OF THE EMBODIMENTS

Figure 1:
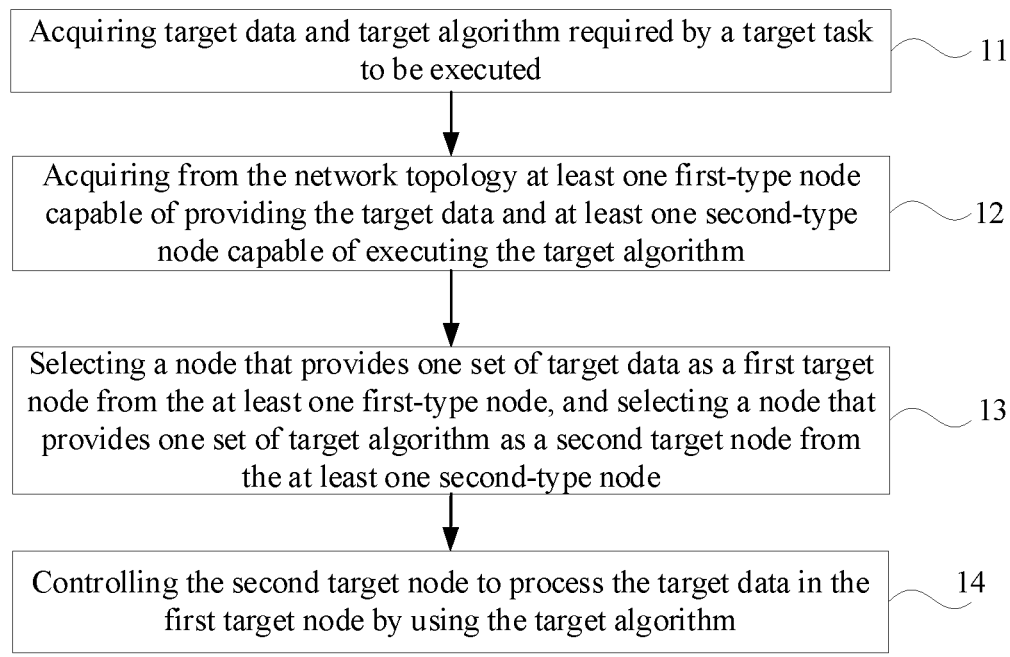
FIG. 1 is a flowchart of a task processing method provided by an embodiment of the present application.

The exemplary embodiments of the present application will be described in further detail with reference to the drawings. Although the exemplary embodiments of the present application are shown in the drawings, it should be understood that the present application may be embodied in various forms and should not be construed as limited to the embodiments set forth herein. On the contrary, these embodiments are provided so that the present application can be understood more thoroughly, and the scope of the present application can be fully conveyed to those skilled in the art.

The embodiments of the present application provide a task processing method applied to a network topology, wherein the network topology includes a plurality of nodes. Optionally, the network topology includes a control node, and the control node stores capability information of the nodes in the network topology except the control node, that is, other nodes except the control node can report respective capability information to the control node regularly, therefore, the task processing method according to the embodiments of the present application may be executed by the control node.

Figure 2:
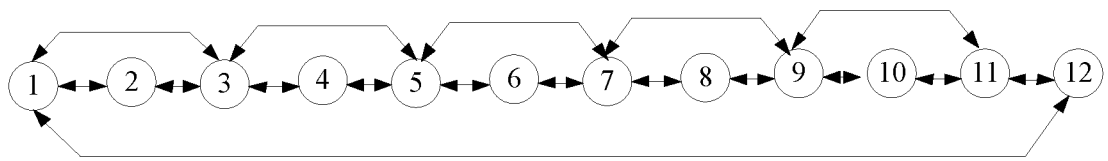
FIG. 2 is a schematic diagram of a single-layer network structure in a network topology in an embodiment of the present application.

Optionally, as shown in FIG. 2, the network topology includes: at least one layer of network structure, each layer of network structure includes at least one loop structure, and each loop structure includes a plurality of nodes; wherein the nodes in each loop structure are connected from head to tail, and according to a numbering sequence of the nodes in each loop structure, an odd node is connected to the next node of its adjacent node, or an even node is connected to the next node of its adjacent node. It may be understood that the specific connection mode for the loop structure is not limited herein, but may also be that the plurality of nodes included in each loop structure are connected from head to tail and are connected to the node next to the adjacent node thereof.

Therefore, it can be seen that the network topology includes a fault-tolerant network with multiple layers connected in series and loops, wherein the structure used in each layer is same, and each layer uses the same loop topology, and the layers are vertically bridged. Such same hardware equipment, the repeated superposition of the same structure, and the same software management gradually expand the degree of resource aggregation and complete the application-oriented super project. In addition, there is no connection across more than two layers in this structure, which simplifies the software structure and system management. Communication loops with different intervals in the layer ensure that the loop may not be interrupted, and normal communication may be maintained when any two points in the loop fail (including PCB board extraction).

Optionally, there are at least two connection paths between two adjacent layers of network structures. For example, a third node of a first-layer network structure is connected with a fourth node of a second-layer network structure, and a fifth node of the first-layer network structure is connected with a sixth node of the second-layer network structure, that is, there may be two connection paths between the first-layer network structure and the second-layer network structure.

Optionally, a plurality of computing devices are divided into at least one layer of network structure, wherein the computing devices include:

a storage unit and at least one computing unit, wherein the storage unit includes a first virtual management unit circuit for communicating and managing the storage unit, and the computing unit includes a second virtual management unit circuit for communicating and managing the computing unit; the first virtual management unit circuit and the second virtual management unit circuit are connected with an external physical communication interface, respectively;

a PCB single board, wherein the storage unit and the computing unit are located on the PCB single board;

a board frame, wherein the PCB single board is disposed on the board frame;

a cabinet, wherein the board frame is disposed in the cabinet;

a computer room, wherein the cabinet is disposed in the computer room;

a first data management center, wherein the first data management center includes at least two computer rooms; and a second data management center, wherein the second data management center includes two of the first data management centers.

Therefore, it can be seen that the computing device includes the storage unit and the computing unit, and both the storage unit and the computing unit are provided with the virtual management unit circuit for communication and management, and are connected with the external physical communication interface, such that the storage unit and the computing unit are parallel, and different computing units are parallel. Therefore, it can be seen that, the computing device in the embodiments of the present application no longer distinguishes between computing and network, but melts computing and storage into the network, and sets the computing unit to have a unified interface for external communication, so that the computing and storage can be paralleled, Therefore the data processing speed can be improved, and to some extent, the explosive demand of massive data and computing power caused by artificial intelligence and blockchain can be met.

Further, the plurality of computing devices are divided into an eight-layer network structure, wherein, the node of the first-layer network structure which is silicon (S) is a unit circuit of the computing unit, and it is capable of programing the internal circuit structure and managing it; the node of the second-layer network structure represented as board (B) is the computing unit, which is used in a single PCB, and 10 Gbps communication wires are disposed in the single PCB with PCB maintenance between multiple chips; the node of the third-layer network structure represented as frame (F) is the single PCB, which is used in a single frame, and 10 Gbps communication wires are disposed in the PCB between the backboards of the multiple PCBs and in full communication; the node of the fourth-layer network structure represented as cabinet (C) is a board frame, which is used in a single cabinet, and 10 Gbps communication wires are disposed in the frame between multiple board frames and in full communication; the node of the fifth-layer network structure represented as district (D) is the cabinet, which is partitioned between multiple cabinet in the data center, and the 10 Gbps optical fiber network is entirely not required to be used in the computer room; the node of the sixth-layer network structure represented as zone (Z) is the computer room, which is partitioned between multiple computer rooms in the data center, and the 10 Gbps optical fiber network is entirely not required to be used in the computer room; the node of the seventh-layer network structure represented as enterprise (E) is the first data management center, which is configured with a wide-area optical fibers according to its demand, and the Internet caries the whole network management; the node of the eighth-layer network structure represented as world (W) is the second data management center, which is configured with a wide-area optical fibers according to its demand, and the Internet carries the whole network management. It may be understood that for the network topology composed of a plurality of computing devices, the division form of each layer of the network structure is not limited herein.

The above eight layers of network structures can be located by eight groups of 8 bit, totaling 64 bit. That is to say, a working status of any device, or any unit circuit or any hard disk in the device may be independently queried and managed in the whole network (the whole world). Apparently, this network topology design can meet the demand for a long time in the future. This network topology could be easily added with more layers of network structures above the data center (i.e., W layer) if, at some point in the future, the network does not scale enough to meet application requirements. If the number of independent objects that may be served by a superchip increases significantly in the future, resulting in insufficient network address allocation, it is easy to scale below a chip layer (i.e., S layer) and even locate to a cellular level. It follows that the network topology may be scaled indefinitely to meet possible future needs.

In addition, the described network topology may define three types of hardware resources and uniquely locate the hardware resources with uniform 64 bit addresses.

The first resources refer to small particle resource: referring to resources with full function inside the chip, and marked location with address field S (Silicon).

The second resources refer to single board resources: referring to internal resources of a board card with full function, and marked location with address field B (Board).

The third resources refer to multi-card combined resources: generally, referring to multi-card integrated resources assembled by independent board cards, including the combination of various cabinets and computer rooms. The resources are classified into six levels, which are marked locations with address fields F (Frame), C (Cabinet), D (District), Z (Zone), E (Enterprise), and W (World), respectively.

As shown in FIG. 1, the task processing method includes:

Step 11: acquiring target data and target algorithm required by a target task to be executed.

The target data includes at least one data, for example, may include A and B data. The target algorithm includes at least one algorithm, for example, may include C and D algorithms. In the embodiment of the present application, the target data corresponds to the target algorithm, that is, the target data is the data required to execute the target algorithm. For example, if the target task to be executed is to execute the C algorithm and the D algorithm successively on the A and B data, then the A and B data correspond to the C and D algorithms.

Optionally, before acquiring the target data and the target algorithm required by the target task to be executed, the method further includes:

according to capability information of the nodes in the network topology, splitting the task to be executed into at least one subtask, and determining one subtask thereof as the target task.

Therefore, it can be seen that, in the embodiment of the present application, when the task to be executed involves a complex algorithm, the task can be split according to the capability information of each node in the network topology (i.e., which algorithm processing capabilities each node has, respectively), so as to obtain multiple subtasks, wherein the algorithm of one subtask is provided by one node.

For each subtask obtained by splitting, there is a corresponding execution sequence, such as splitting to obtain a subtask I, a subtask II and a subtask III. The data and algorithms required by the subtask I and the subtask II do not conflict with each other and may be executed concurrently. The data required by the subtask III is data generated by the subtask I and the subtask II, so the subtask I and the subtask II may be executed concurrently. For the subtask I and the subtask II, the nodes that can provide data and algorithms in the network topology may be acquired first, then one node that can provide data and one node that can provide algorithms are selected, and then the node that provides algorithms process the data provided by the node that provides data, and then store the processed data. In addition, when executing the subtask III, the nodes that execute the algorithms of the subtask I and the subtask II are clearly defined, then nodes in the network topology that can provide an algorithm corresponding to the subtask III may be determined first, and then one node that can provide the algorithm corresponding to the subtask III may be selected, and the data required by the subtask III stored in the nodes that execute the algorithms of the subtask I and the subtask II is processed to execute the whole task.

Specifically, for example, the first five minutes of a 10-minute source video need to be processed by a first model, and the last five minutes of the source video are processed by a second model, and finally the videos processed by the two models are synthesized, then the task may be divided into three subtasks, namely:

subtask I: processing the first five minutes of the source video by the first model;

subtask II: processing the last five minutes of the source video by the second model; and subtask III: synthesizing the videos.

For the subtask I: firstly, it is desirable to acquire nodes that can provide the source video and the nodes that can provide the first model in the network topology, so as to select one node that can provide the source video and one node that can provide the first model, and then transmit a video stream of the first five minutes of the source video to the selected node that can provide the first model.

For the subtask II: since one node that can provide the source video is selected for the subtask I, in the processing procedure of the subtask II, it is desirable to acquire nodes that can provide the second model in the network topology, therefore selecting one node that can provide the second model, so as to transmit a video stream of the last five minutes of the source video to the selected node that can provide the second model.

For the subtask III: because the data required by the subtask III is the data obtained after executing the subtask I and the subtask II, in the processing procedure of the subtask III, it is desirable to acquire nodes that can synthesize videos in the network topology, so as to select one node that can synthesize videos to synthesize the data output by the node providing the first model in the subtask I and the data output by the node providing the second model in the subtask II.

Therefore, it can be seen that, according to the embodiment of the present application, tasks with complex algorithms may be split, so that the algorithms of each task are distributed in the network instead of being executed by one node at the same time, which can not only reduce the capability requirement of a single node, but also shorten the task processing time.

Step 12: acquiring from the network topology at least one first-type node capable of providing the target data and at least one second-type node capable of executing the target algorithm.

In the embodiment of the present application, after acquiring the target algorithm and the target data required by the target task to be executed, the node which can provide the target data and the node which can provide the target algorithm in the network topology are acquired through the above step 12. It follows that, in the embodiment of the present application, the data and the algorithm are distributed to the network, respectively, instead of storing the data in the node which needs to perform the target task, and it is no longer necessary for the node that executes the target task to execute the target algorithm by itself. But the target algorithm is distributed to the node with the processing capability of the target algorithm to execute, that is, the embodiment of the present application combines distributed storage with distributed computing, which can reduce the capability of a single node in the network topology, thereby reducing the design cost of the single node, and further reducing the design cost of the whole network topology.

Step 13: selecting a node that provides one set of target data as a first target node from the at least one first-type node, and selecting a node that provides one set of target algorithm as a second target node from the at least one second-type node.

The network topology includes a plurality of nodes, so there may be a plurality of nodes that can provide the target data and a plurality of nodes that can execute the target algorithm. Moreover, it is possible that the target data is distributed on the plurality of nodes, and the target algorithm is also distributed on the plurality of nodes. However, only the node that provides one set of target data and the node that provides one set of target algorithm are needed to perform the target task.

Optionally, selecting the node that provides one set of target data as the first target node from the at least one first-type node, and selecting the node that provides one set of target algorithm as the second target node from the at least one second-type node, includes:

acquiring a combination formed by the node that provides one set of target data and the node that provides one set of target algorithm; and selecting one target combination according to capability information of each combination, determining the node that provides one set of target data in the target combination as the first target node, and determining the node that provides one set of target algorithm in the target combination as the second target node;

wherein, the capability information of the combination includes at least one of a time delay from the node that provides one set of target data to the node that provides one set of target algorithm in the combination, a duration required for the node that provides one set of target algorithm to execute the target algorithm, and a cache space size of the node that provides one set of target algorithm.

It should be noted that if the task is not split before the step 11 above, one set of target algorithm may be provided by a plurality of nodes. Therefore, in this case:

in a first aspect, if the node that provides one set of target data also includes a plurality of nodes, the time delay from the node that provides one set of target data to the node that provides one set of target algorithm may be a difference or an average value of the time delay from each node that provides the target data to each node that provides the target algorithm. For example, the node that provides one set of target data include nodes a and b, and the node that provides one set of target algorithm nodes are c and d nodes, then the difference or average value of the time delays of a-c, b-c, a-d and b-d may be used as the time delay between the set of nodes that provide the target data and the set of nodes that provide the target algorithm.

In a second aspect, the duration required for the node that provides one set of target algorithm to execute the target algorithm may be a sum or an average value of the duration required for executing the respective provided algorithm in the set.

In a third aspect, the duration cache space size of the node that provides one set of target algorithm may be a sum or an average value of the cache space of the node that provides the target algorithm in the set.

If the task is split before the step 11 above, then one set of target algorithm is provided by one node. Therefore, in this case:

in a first aspect, if the node that provides one set of target data also includes a plurality of nodes, the time delay from the node that provides one set of target data to the node that provides one set of target algorithm may be a difference or an average value of the time delay from each node that provides the target data to the node that provides the target algorithm. For example, the node that provides one set of target data include nodes a and b, and the node that provides one set of target algorithm nodes is a c node, then the difference or average value of the time delays of a-c and b-c may be used as the time delay between the set of nodes that provide the target data and the node that provides the target algorithm.

In a second aspect, the duration required for the node that provides one set of target algorithm to execute the target algorithm is the duration required by the node that provides the target algorithm to execute the target algorithm.

In a third aspect, the cache space size of the node that provides one set of target algorithm may be a cache space of the node that provides the target algorithm.

In addition, for the above combinations, for example, the target data includes two A and B data, which may be provided by the a and b nodes in the network topology, respectively, and the target algorithm includes the C algorithm, which may be provided by the c and d nodes in the network topology, and the combinations that can be obtained are as follows:

combination I: a, b and c; and
combination II: a, b and d.

The capability information of the above four combinations may be acquired, respectively, and then one combination may be selected according to the respective capability information of the four combinations, so that the target data provided by the node that provides the target data in the combination is processed by the node that provides the target algorithm in the selected combination by using the target algorithm.

In addition, the target combination is the combination with the strongest capability among all the combinations formed by the node that provides one set of target data and the node that provides one set of target algorithm. The capability of the combination may be expressed by at least one of the time delay from the node that provides one set of target data to the node that provides one set of target algorithm, the duration required for the node that provides one set of target algorithm to execute the target algorithm, and the cache space size of the node that provides one set of target algorithm, for example, the smaller the time delay from the node that provides one set of target data to the node that provides one set of target algorithm, the smaller the duration required for the node that provides one set of target algorithm to execute the target algorithm, and the larger the cache space of node that provides one set of target algorithm, the stronger the capability of the combination.

Optionally, selecting one target combination according to the capability information of each combination, includes:

selecting a combination corresponding to a minimum value of the time delay from the node that provides one set of target data to the node that provides one set of target algorithm in the combination as the target combination;

or, selecting a combination corresponding to a minimum value of the duration required for the node that provides one set of target algorithm to execute the target algorithm in the combination as the target combination;

or, selecting a combination corresponding to a maximum value of the cache space of the node that provides one set of target algorithm in the combination as the target combination;

or, selecting a combination corresponding to a minimum value of a sum of the time delay from the node that provides one set of target data to the node that provides one set of target algorithm in the combination and the duration required for the node that provides one set of target algorithm to execute the target algorithm in the combination as the target combination;

or, selecting a combination corresponding to a minimum value of a first ratio in the combination as the target combination, wherein the first ratio is a ratio of the time delay from the node that provides one set of target data to the node that provides one set of target algorithm in the combination to a value of the cache space size of the node that provides one set of target algorithm in the combination;

or, selecting a combination corresponding to a minimum value of a second ratio in the combination as the target combination, wherein the second ratio is a ratio of the duration required for the node that provides one set of target algorithm to execute the target algorithm to the value of the cache space size of the node that provides one set of target algorithm in the combination.

It can be seen from the above that in the embodiment of the present application, any one of the above six ways may be adopted to select the target combination. It may be understood that the specific way of selecting the target combination is not limited herein, but may also be other ways of selecting according to the capability information of the combination.

Step 14: controlling the second target node to process the target data in the first target node by using the target algorithm.

Optionally, controlling the second target node to process the target data in the first target node by using the target algorithm, includes:

sending first instruction information to the first target node by the first-type node, wherein the first instruction information is used for instructing the first target node to send the target data to the second target node; and sending second instruction information to the second target node by the first-type node, wherein the second instruction information is used for instructing the second target node to process the target data by using the target algorithm.

In the embodiment of the present application, after selecting the node that provides one set of target data (i.e., the first target node) and the node that provides one set of target algorithm (i.e., the second target node) through the above step 13, the node that needs to perform the target task sends the instruction information to the first target node, such that the first target node sends the stored target data to the second target node, and the second target node processes the target data by using the target algorithm, so as to return the processed data to the node that needs to perform the target task.

It should be noted that if the task is not split before the step 11 above, one set of target algorithm may be provided by a plurality of nodes. Therefore, in this case:

if the node that provides one set of target data includes a plurality of nodes, the plurality of nodes that provide one set of target data transmit the corresponding data to the corresponding algorithm nodes, respectively. For example, the nodes that provide one set of target data include a and b nodes, and the nodes that provide the target algorithm include c and d nodes. The data provided by the node a needs to be processed by the node c, and the data provided by the node b needs to be processed by the node d. Then, the node a needs to transmit the data to the node c, and the node b needs to transmit the data to the node d for processing.

That is, when one set of target algorithm is provided by a plurality of nodes, and one set of target data is provided by a plurality of nodes, the target algorithm and the target data need to be processed according to a corresponding relationship between the data and the algorithm and an execution sequence of each algorithm.

If the task is split before the step 11 above, then one set of target algorithm is provided by one node. Therefore, in this case:

the nodes that provide the target data send the data provided to the nodes that provide the target algorithm, respectively, and the nodes that provide the target algorithm can process the received data.

Optionally, when that the target data includes a video stream or an audio stream, controlling the second target node to process the target data in the first target node by using the target algorithm, includes:

controlling the second target node to process a received first data packet of the target data sent by the first target node by using the target algorithm;

wherein, the first data packet includes a video stream or an audio stream with a preset duration. The video of the preset duration may include a preset number of video frames.

Optionally, after controlling the second target node to process the received first data packet of the target data sent by the first target node by using the target algorithm, the method further includes:

in the process of receiving the processed first data packet sent by the second target node, controlling the second target node to process a received second data packet of the target data sent by the first target node by using the target algorithm;

wherein, the second data packet includes a video stream or an audio stream with a preset duration.

In the embodiment of the present application, when processing the video stream or the audio stream, the data packets may be processed one by one, and then the processed data packets may be sent out, that is, in the embodiment of the present application, by data-driven computing, instead of waiting for the data collection to be completed, the computing is performed in steps during the output transmission, which improves efficiency and shortens the time delay.

Optionally, the network topology includes: at least one layer of network structure, wherein each layer of network structure includes a plurality of nodes connected in a predetermined way. Value ranges of data transmission time delays corresponding to different layers are different, and the data transmission time delay corresponding to the first target layer of network structure includes a data transmission time delay from a node in the first target layer of network structure to the target node, and the first target layer of network structure is any layer of the network structure.

Figure 3:
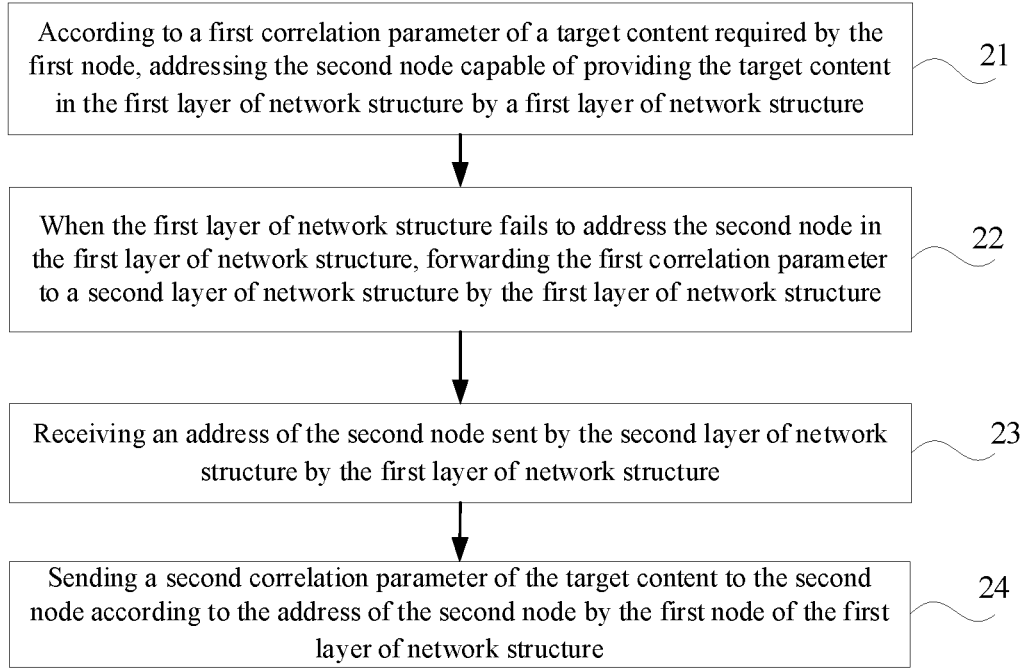
FIG. 3 is a flowchart of another task processing method provided by an embodiment of the present application.

As shown in FIG. 3, before acquiring from the network topology the at least one first-type node capable of providing the target data and the at least one second-type node capable of executing the target algorithm, the method further includes:

Step 21: according to a first correlation parameter of a target content required by the first node, addressing the second node capable of providing the target content in the first-layer network structure by a first-layer network structure.

The first node is located in the first-layer network structure. The first-layer network structure addresses the second node capable of providing the target content in the first-layer network structure according to the first correlation parameter of the target content required by the first node, that is, the first-layer network structure addresses a content of the second node capable of providing the target content in the first-layer network structure according to the first correlation parameter. That is, addressing is performed through the first correlation parameter instead of a real address, so that certain security can be enhanced. In addition, according to the embodiment of the present application, the content addressing is carried out in the layer, so that a content addressing range is reduced, and certain overhead is reduced.

The second node may be a first-type node or a second-type node. When the first-layer network structure addresses the second node of providing the target data according to the first correlation parameter of the target data required by the first node, the second node is the first-type node. When the first-layer network structure addresses the second node of providing the target algorithm according to the first correlation parameter of the target algorithm required by the first node, the second node is the second-type node.

Step 22: when the first-layer network structure fails to address the second node in the first-layer network structure, forwarding the first correlation parameter to a second-layer network structure by the first-layer network structure.

In the embodiment of the present application, when the second node providing the target content is not addressed in the first-layer network structure through step 21, the first-layer network structure needs to forward the first correlation parameter to the second-layer network structure, such that the second-layer network structure may continue to address the second node capable of providing the target content according to the first correlation parameter.

Step 23: receiving an address of the second node sent by the second-layer network structure by the first-layer network structure.

The address of the second node is obtained after the second-layer network structure addresses the second node in the second-layer network structure according to the first correlation parameter.

In addition, if the second-layer network structure fails to address the second node capable of providing the target content in the second-layer network structure, the second-layer network structure continues to forward the first correlation parameter to other layers of network structure until the second node is addressed, or stop addressing the second node until a whole addressing time of the second node reaches a preset time.

Step 24: sending a second correlation parameter of the target content to the second node according to the address of the second node by the first node of the first-layer network structure.

In the embodiment of the present application, when the second-layer network structure successfully addresses the second node capable of providing the target content in the second-layer network structure, the second-layer network structure sends the address of the second node to the first node of the first-layer network structure, so that the first node may send the second correlation parameter of the target content to the second node according to the address of the second node.

After receiving the second correlation parameter, the second node reports the target content to the first node according to a path from the second node to the first node.

It can be seen from the above that the task processing method provided by the embodiment of the present application addresses the content of the second node that can provide the target content according to the first correlation parameter of the target content required by the first node in the first-layer network structure where the first node is located, and directly forwards the first correlation parameter to the second-layer network structure when the second node is not addressed in the first-layer network structure, so as to address the second node again in the second-layer network structure until the second node is found, then the first node sends the second correlation parameter of the target content to the second node according to the address of the second node. Therefore, it can be seen that, in the task processing method of the embodiment of the present application, in the process of addressing the second node, only the content is addressed in the layer, and the parameter on which the addressing is based is directly forwarded between the layers, so that the content addressing range is shortened, the overhead is reduced, and the security requirements are met to some extent through the content addressing mode.

Each layer of network structure in the above-mentioned network topology may be provided with a control node or not. The control node stores the capability information of all the nodes in this layer of network structure, that is, other nodes in this layer of network structure may periodically report respective capability information thereof to the control node of this layer except the control node.

According to the task processing method of the embodiment of the present application, the specific implementation mode differs between the case where the control node is set in each layer of network structure, and the case where no control node is set.

Specifically, for the case that no control node is set in each layer of network structure:

Optionally, according to the first correlation parameter of the target content required by the first node, addressing the second node capable of providing the target content in the first-layer network structure by the first-layer network structure, includes:

broadcasting the first correlation parameter in the first-layer network structure by the first node of the first-layer network structure.

In the embodiment of the present application, when the control node is not provided in the first-layer network structure, the first node may directly broadcast the first correlation parameter in the first-layer network structure, and other nodes in the first-layer network structure may respectively determine whether they can provide the target content to the first node after receiving the first correlation parameter.

Optionally, when the first-layer network structure fails to address the second node in the first-layer network structure, forwarding the first correlation parameter to the second-layer network structure by the first-layer network structure, includes:

when the first node of the first-layer network structure does not receive the address of the second node within a preset time period after broadcasting the first correlation parameter, sending instruction information to a third node of the first-layer network structure; and forwarding the first correlation parameter to the fourth node of the second-layer network structure according to the instruction information by the third node of the first-layer network structure.

wherein, the third node is connected with the fourth node.

Therefore, it can be seen that, in the embodiment of the present application, the first-layer network structure and the second-layer network structure realize communication through the connection between the third node and the fourth node.

In addition, if the first node does not receive feedback information of other nodes in the first-layer network structure within a preset time period after broadcasting the first correlation parameter, it means that there is no node that can provide the target content in the first-layer network structure, and it is desirable to continue searching in other layers. In this case, the first node may send the instruction information to the third node according to a communication link between the first node and the third node, such that the third node can forward the first correlation parameter to the fourth node in the second-layer network structure, so that the fourth node can continue addressing the second node that can provide the first node with the target content in the second-layer network structure.

Optionally, receiving the address of the second node sent by the second-layer network structure by the first-layer network structure, includes:

receiving the address of the second node sent by the fourth node of the second-layer network structure by the third node of the first-layer network structure; wherein the address of the second node sent by the fourth node is received from the second node after the fourth node broadcasts the first correlation parameter in the second-layer network structure; and receiving the address of the second node sent by the third node of the first-layer network structure by the first node of the first-layer network structure; wherein the address of the second node sent by the third node is sent to the third node by the fourth node.

Therefore, it can be seen that, in the embodiment of the present application, after receiving the first correlation parameter sent by the third node, the fourth node broadcasts the first correlation parameter in the second-layer network structure. After receiving the first correlation parameter, other nodes in the second-layer network structure may determine whether they can provide the target content except the fourth node. If so, the other nodes except the fourth node may feed addresses thereof to the fourth node through a connection to the fourth node, such that the fourth node can further forward the addresses to the third node, so that the third node further forwards the addresses to the first node through a communication link from the third node to the first node.

Figure 4:
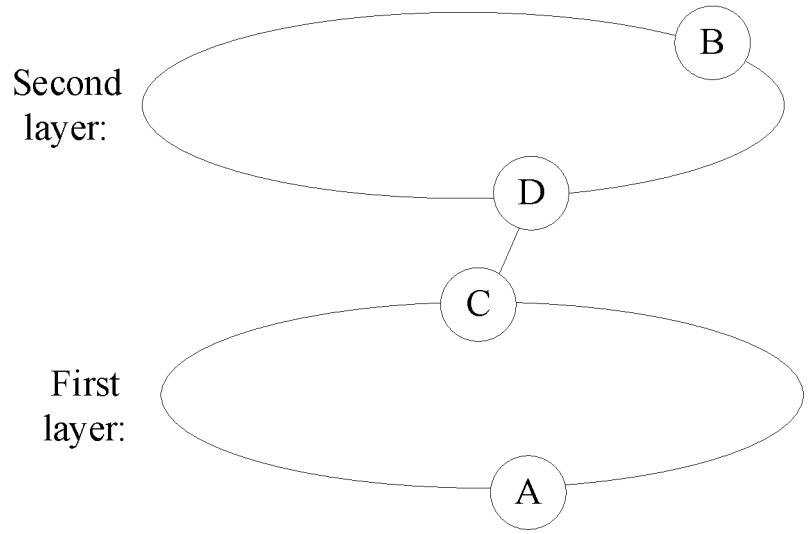
FIG. 4 is a first distribution schematic diagram of nodes involved in an addressing process in the network topology in an embodiment of the present application.

In conclusion, when no control node is set in each layer of the network topology, the process of addressing the second node capable of providing the target content in the task processing method of the embodiment of the present application may be shown in FIG. 4 for example. That is, the first node A broadcasts the first correlation parameter in the first layer, and after that the first node A does not receive feedback from other nodes in the first layer within a preset time, then the first node A sends instruction information to the third node C through a path to the third node C. After receiving the instruction information, the third node C sends the first correlation parameter to the fourth node D. the fourth node D then broadcasts the first correlation parameter in the second layer, thereafter, the second node B receives the first correlation parameter and determines that the second node B can provide the target content itself, then the second node B feeds the address thereof to the fourth node D through a path to the fourth node D. The fourth node D then forwards the address of the second node B to the third node C. The third node C sends the address of the second node B to the first node A through a path to the first node A. For the sake of understanding, only the first node to the fourth node is drawn in the first layer and the second layer in FIG. 4.

Optionally, the task processing method further includes:

receiving the address of the second node sent by the second node of the first-layer network structure by the first node of the first-layer network structure.

That is, when no control node is set in each layer of the network topology, after the first node broadcasts the first correlation parameter in the first-layer network structure, if there is the second node capable of providing the target content in the first-layer network structure, then the second node sends the address of the second node to the first node through the communication link with the first node.

Figure 5:
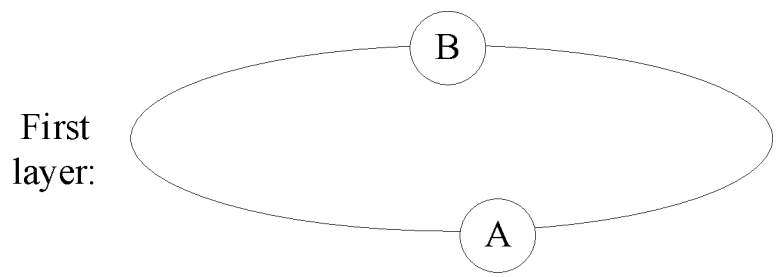
FIG. 5 is a second distribution schematic diagram of the nodes involved in the addressing process in the network topology in the embodiment of the present application.

Therefore, it can be seen that, when no control node is set in each layer of the network topology, the process of addressing the second capable of providing the target content to the first node in the task processing method of the embodiment of the present application may also be shown in FIG. 5 for example. That is, the first node A broadcasts the first correlation parameter in the first layer, the second node B receives the first correlation parameter and determines that the second node B can provide the target content itself, then the second node B feeds the address thereof to the first node A through a path to the first node A. For the sake of understanding, only the first node and the second node are drawn in the first layer in FIG. 5.

Specifically, for the case that no control node is set in each layer of network structure:

Optionally, a first control node is set in the first-layer network structure, and the first control node stores capability information of the nodes in the first-layer network structure; and according to the first correlation parameter of the target content required by the first node, addressing the second node capable of providing the target content in the first-layer network structure by the first-layer network structure, includes:

sending the first correlation parameter to the first control node of the first-layer network structure by the first node of the first-layer network structure; and according to the first correlation parameter and the capability information of the nodes in the first-layer network structure, addressing the second node by the first control node of the first-layer network structure.

In the embodiment of the present application, when the first control node is provided in the first-layer network structure, because the first control node stores the capability information of the nodes in the first-layer network structure, the first control node itself can determine which node or nodes in the first-layer network structure can provide the target content. Therefore, the first node only needs to send the first correlation parameter to the first control node.

Optionally, a second control node is set in the second-layer network structure, and the second control node stores capability information of the nodes in the second-layer network structure; and when the first-layer network structure fails to address the second node in the first-layer network structure, forwarding the first correlation parameter to the second-layer network structure by the first-layer network structure, includes:

when the first control node of the first-layer network structure determines that the second node does not exist in the first-layer network structure according to the first correlation parameter and the capability information of the nodes in the first-layer network structure, sending the first correlation parameter to the second control node of the second-layer network structure by first control node of the first-layer network structure.

The first control node decides according to the capability information of the nodes in the first-layer network structure, when there is no node capable of providing the target content in the first-layer network structure, the first control node needs to send the first correlation parameter to the second control node in the second-layer network structure, such that the second control node can determine whether there is a node capable of providing the target content in the second-layer network structure.

In addition, if the first control node and the second control node are not directly connected (that is, the first control node is not directly connected to the node of the second-layer network structure, or the second control node is not directly connected to the node of the first-layer network structure), for example, the third node of the first-layer network structure is connected to the fourth node of the second-layer network structure, and neither the third node nor the fourth node is a control node, in the process that the first control node sends the first correlation parameter to the second control node, the first control node needs to send the first correlation parameter to the third node through a communication link with the third node first. Then, the third node forwards the first correlation parameter to the fourth node. Finally, the fourth node sends the first correlation parameter to the second control node through a communication link with the second control node.

Optionally, receiving the address of the second node sent by the second-layer network structure by the first-layer network structure, includes:

receiving the address of the second node sent by the second control node of the second-layer network structure by the first control node of the first-layer network structure, wherein the address of the second node sent by the second control node is determined by the second control node according to the first correlation parameter and the capability information of the nodes in the second-layer network structure; and receiving the address of the second node sent by the first control node of the first-layer network structure by the first node of the first-layer network structure.

Therefore, it can be seen that, in the embodiment of the present application, after receiving the first correlation parameter, the second control node may decide which node or nodes in the second-layer network structure can provide the target content according to the capability information of the nodes in the second-layer network structure, and when there is a node that can provide the target content, feed an address of the node to the first control node in the first-layer network structure, such that the first control node can send the address to the first node.

Figure 6:
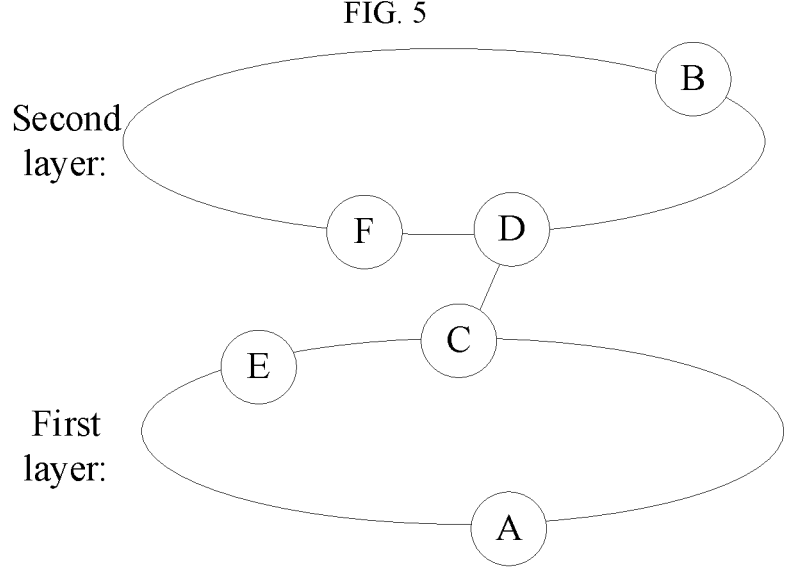
FIG. 6 is a third distribution schematic diagram of the nodes involved in the addressing process in the network topology in the embodiment of the present application.

In conclusion, when the control node is set in each layer of the network topology, the process of addressing the second node capable of providing the target content in the task processing method of the embodiment of the present application may be shown in FIG. 6 for example. That is, when the first node A sends the first correlation parameter to the first control node E, and the first control node E decides that there is no node in the layer that can provide the target content according to the capability information of the nodes in the first layer, the first control node E sends the first correlation parameter to the third node C through a path with the third node C. The third node C forwards the first correlation parameter to the fourth node D. The fourth node D then forwards the first correlation parameter to the second control node F in the second layer. If the second control node F decides that there is a node that can provide the target content in the second layer, i.e., the second node B, according to the capability information of the nodes in the second layer, then the second control node F sends the address of the second node B to the fourth node D through a path with the fourth node D. The fourth node D then forwards the address of the second node B to the third node C. The third node C then sends the address of the second node B to the first control node E through a path with the first control node E, so that the first control node E can send the address of the second node B to the first node A through a path with the first node A. For the sake of understanding, only the first node to the fourth node as well as the first control node and the second control node are drawn in the first layer and the second layer in FIG. 6.

As can be seen from the above, when the control node is set in each layer of the network topology, the first correlation parameter of the target content is broadcasted by the control node, and the address of the node that can provide the target content is fed back by the control node, the node that needs the target content may not need to know the node that provides the target content, and the node that provides the target content may also not need to know for which node the target content is provided, so that the security in the addressing process can be further improved.

Optionally, the task processing method further includes:
receiving the address of the second node of the first-layer network structure sent by the first control node of the first-layer network structure by the first node of the first-layer network structure;
wherein, the address of the second node sent by the first control node is determined by the first control node according to the first correlation parameter and the capability information of the nodes in the first-layer network structure.

That is, when the control node is set in each layer of the network topology, the first node sends the first correlation parameter to the first control node of the first layer of the network structure, and the first control node determines whether there is the second node that can provide the target content in the first layer of the network structure according to the first correlation parameter and the capability information of the nodes in the first layer of the network structure, and if so, the first control node sends the address of the second node to the first node.

Figure 7:
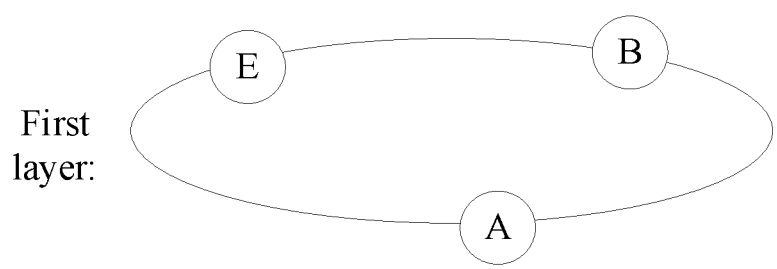
FIG. 7 is a fourth distribution schematic diagram of the nodes involved in the addressing process in the network topology in the embodiment of the present application.

Therefore, it can be seen that, when the control node is set in each layer of the network topology, the process of addressing the second node capable of providing the target content in the task processing method of the embodiment of the present application may also be shown in FIG. 7 for example. That is, the first node A sends the first correlation parameter to the first control node E in the first layer, and the first control node E decides that there is the node that can provide the target content in the first layer, then the first control node E sends the address of the second node B to the first node A through a path with the first node A. For the sake of understanding, only the first node, the second node and the first control node are drawn in the first layer and the second layer in FIG. 7.

In conclusion, in the embodiment of the present application, content addressing is adopted in the layer, and the parameter on which content addressing is performed is forwarded directly between the layer and the layer, thereby establishing a communication connection. After a link composition is completed, service contents are partitioned according to the addresses and processing functions, the data is marked and sent, a transit node only carries out processing divided for the transit node and reconstitutes the processed packet, and the rest of the content is transmitted. The content is processed during transmission, and no more data is transmitted after each processing, but knowledge generated by the processed data is transmitted.

Figure 8:
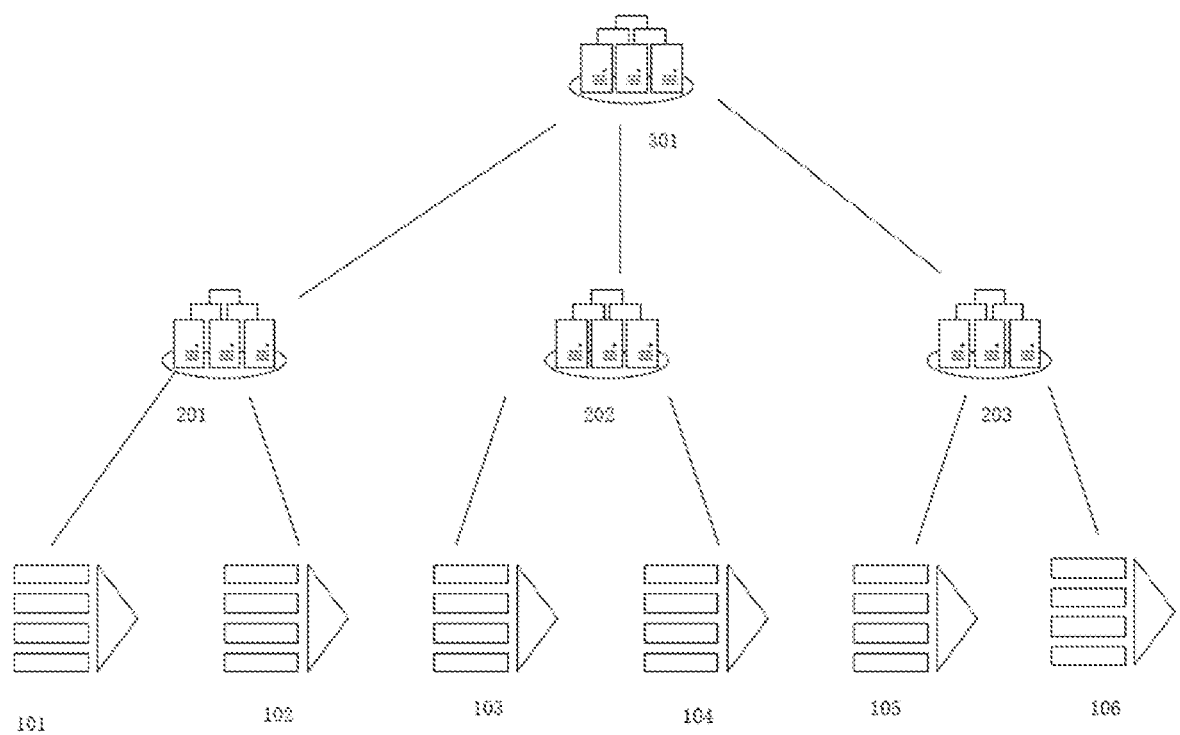
FIG. 8 is a schematic structural diagram of a network topology provided by an embodiment of the present application.

In conclusion, for the task processing method of the embodiment of the present application, specific application scenarios may be exemplified as follows:

For example, as shown in FIG. 8, one network topology includes a three-layer network structure, where the first layer includes nodes 101-106, the second layer includes nodes 201-202, and the third layer includes node 301. The node 101 stores real shooting data of a video, the node 102 stores AR materials, and the node 103 stores 3D scanned data.

When the 301 node needs a real shooting video in the 101 node as the background, the AR materials in the node 102 to increase the interest, and the scanned data of the node 103 as the content, at the beginning of the service, the node 301 sends out three requests, which may be broadcasted or sent directly from point to point, wherein the requests include: service type, resource request, data type and content description.

The node 101, the node 102 and the node 103 respond to the requests, respectively, with sample content feedback. After receiving the feedback from the nodes 101, 102 and 103, the node 301 plans a processing path by using the task processing method of the embodiment of the present application, that is, the node that provides data and the node that provides contents are determined. For example, the nodes that provide data are the node 101, the node 102 and the node 103, and the node that provides algorithm is the node 201, then the node 301 may issue a required video background generation code to the node 101 and issue an AR action and a time point to the node 102, issue 3D extraction time information and contents needed to the node 103, and issue a video synthesis code to the node 201.

After that, the 101 node uses the tools issued by the node 301 to preprocess the required video to generate a background video, which is encoded and compressed and then sent to the node 201. The node 102 provides the AR material to the node 201 according to the required AR action and time point. The node 103 provides the 3D contents to the node 201 according to the required 3D contents and time point. The node 201 receives the related data provided by the node 101, the node 102 and the node 103 for video synthesis, transcodes, synthesizes a new video, and then forwards the new video to the node 301.

In conclusion, according to the embodiment of the present application, the data and the algorithms are distributed to the network, respectively, instead of uniformly storing the data to the node that needs to perform the target task, or executing the target algorithm by the node that needs to execute the target algorithm, but are distributed to the node with the processing capability of the target algorithm to execute, that is, the embodiment of the present application combines a distributed storage with distributed computing, which can not only improve the security of data, but also reduce the capability of a single node in the network topology, thereby reducing the design cost of the single node, and further reducing the design cost of the whole network topology.

Moreover, for the task processing method of the embodiment of the present application, specific application scenarios may also be exemplified as follows:

For example, as shown in FIG. 8, a network topology of one large company includes a three-layer network structure, where the first layer includes service hall nodes 101-106, the second layer includes regional branch office nodes 201-202, and the third layer includes provincial company node 301. Each service hall node is connected with different types of devices, mainly including a face recognition camera, a crowd monitoring camera, a smoke sensor and an air quality sensor. Then these devices collect data separately and store the data in the corresponding service hall nodes.

When the provincial company node needs real-time data, for example, the provincial company node needs to find someone accurately, then the provincial company node addresses a node that can provide a related content of the task in the second layer, for example, the provincial company node may send a task package to the regional branch office nodes in the second layer (or broadcast the task package), and then each regional branch office node may determine whether the task package is the task belonging to the node, Then, the regional branch office node that matches the task sends the task package to the service hall node connected therewith, so that the service hall node that receives the task package parses the data, acquires a service type being firmware update, a data type being code, and a specific device number, and then executes the task according to the acquired information, and gives feedback after the task is completed.

Specifically, the task package sent by the provincial company node includes: real-time report, data type video, device type, and contents being a photo and number of the monitored person. After receiving the task package, the service hall node may execute the following process:

The service office node acquires a netlist file, which is downloaded by an on-board management ARM through a joint test workgroup (jtag) interface, and when the download is completed, a downloading module of the service office node generates a confirmation message and sends the confirmation message to a communication module of the service office node, such that the communication module fills in the content and feed the content back according to a 1 kB frame format. After feedback, the ARM of the service hall node sends an instruction to a FPGA of the service hall node, so that a communication module of the FPGA is opened, such that the FPGA can directly receive IP data of a camera connected with the service hall node (wherein the camera connected with the service hall node runs a User Datagram Protocol (UDP) mode). After receiving the data, the FPGA communication module of the service hall node finishes decoding through a FPGA video decoding module, and hands over to a downloaded AI for reasoning. The AI module feeds back a discovery message, triggers a forwarding mode, records a time point, and forwards the latest video within 1 minute in a double data rate (DDR) to the regional branch office nodes through the communication module. The regional branch office nodes may also make further analysis according to the real-time reports received from various places.

The FPGA maintains a file system through the ARM, and the video content is directly input into a hard disk by the FPGA. The FPGA and the ARM are communicated through a Peripheral Component Interconnect Express (PCIE) interface. In addition, the service hall nodes include multiple FPGAs, and the FPGAs here are only responsible for this scene task, while other daily monitoring tasks are executed by other FPGAs concurrently.

Moreover, the task processing method may also include:
reporting the target data to the first node of the first-layer network structure periodically by the second node of the second-layer network structure.

For example, the network topology of the large company shown in FIG. 8 includes a three-layer network structure. When the service hall nodes periodically report device data, the specific implementation process may be described in the following first step to the fourth step:

First step: the service hall nodes monitor data, service type, device number and data type every day, and store the same in the local. For example, VIP customer related videos may be stored according to service VIP statistics, a first face camera and video source files; or the monitored VIP in-store time statistics may be stored according to the service VIP statistics, the first face camera and in-store time; or the monitored clerk in-store time statistics is stored according to service clerk statistics, the first face camera and the in-store time.

Second step: the service office nodes automatically assemble packages according to a pre-set report content (which is mainly statistical content) at a specified time, wherein a package length is unified by 1 kB. The existing network may still be used for transmission, and an address layer is only used for content identification. There are ten gateways in the service hall nodes, which are responsible for Transmission Control Protocol (TCP)/IP encapsulation and docking with the existing network. This is a standard TCP/IP protocol, and will not be elaborated herein.

Third step: the regional branch office nodes perform local statistics according to the content reported by each service hall node, generate reports, and use messages (see Table 1 for the message format) to continue reporting. There are logical loops between the regional branch office nodes, and each branch office node has data transmission outlets for upper and low layers.

Fourth step: the provincial company node counts the content, such as an average in-store time of VIP, working hours of employees, a passenger flow of each store, and the like.

TABLE 1

| Message format | | | | |
|---|---|---|---|---|
| 8-bit national identity | 8-bit provincial identity | 16-bit regional identity | 16-bit service hall identity | 16-bit device identity |
| 8-bit service type identity | | 16-bit data type identity | 8-bit device type identity | Reservation |

Data + error correction + verification

Optionally, sending the second correlation parameter of the target content to the second node according to the address of the second node by the first node of the first-layer network structure, includes:

sending the second correlation parameter to the third node through a path from the first node to the third node in the first-layer network structure by the first node;

wherein, after receiving the second correlation parameter, the third node forwards the second correlation parameter to the fourth node of the second-layer network structure, such that the fourth node forwards the second correlation parameter to the second node through a path from the fourth node to the second node in the second-layer network structure.

Optionally, sending the second correlation parameter of the target content to the second node according to the address of the second node by the first node of the first-layer network structure, includes:

sending the second correlation parameter to the first node through a path to the first control node by the first node;

wherein, after receiving the second correlation parameter, the first control node forwards the second correlation parameter to the second control node of the second-layer network structure, such that the second control node forwards the second correlation parameter to the second node through a path to the second node.

Optionally, sending the second correlation parameter of the target content to the second node according to the address of the second node by the first node of the first-layer network structure, includes:

sending the second correlation parameter to the second node through a path from the first node to the second node in the first-layer network structure by the first node.

Optionally, sending the second correlation parameter of the target content to the second node according to the address of the second node by the first node of the first-layer network structure, includes:

sending the second correlation parameter to the first node through a path to the first control node by the first node;

wherein, after receiving the second correlation parameter, the first control node sends the second correlation parameter to the second node through a path to the second node.

The network topology defines a path by giving any two points (origin and destination) macroscopically. Therefore, it can be seen from the above that when the first node (i.e., the origin) sends data to the second node (i.e., the destination), it is first determined whether the origin and the destination are at the same network level. If the origin and the destination are at the same network level, the same layer forwarding is performed. If the origin and the destination are not at the same network level, forwarding to the higher or lower level may be performed by vertical bridging between layers.

Figure 9:
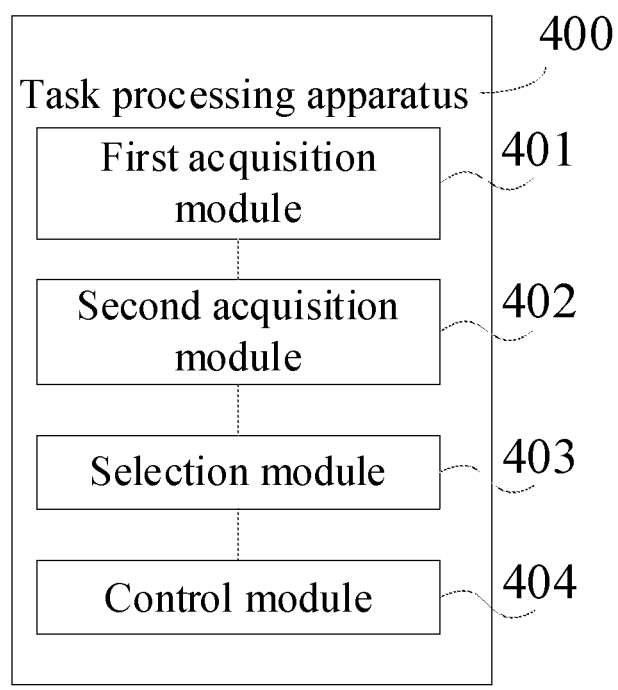
FIG. 9 is a structural block diagram of a task processing apparatus provided by an embodiment of the present application.

Optionally, the node address of the network topology includes a field corresponding to each layer. For example, when the network topology includes a three-layer network structure, the network topology may be divided into a high layer, a middle layer and a low layer. When sending a data packet from the first node to the second node, the specific process may be as follows:

If three addresses of the two nodes are all equal, it means that the data packet arrives at the destination, the switch of the second node accepts the data packet, which means that the exchange function ends and then performing the possible storage and computing operation subsequently. If the two points are not completely equal, then a further analysis is required; if the addresses of the high layers of the two points are different, then forwarding the data packet to the high layer network structure by bridging. Furthermore, if the node is not directly connected with the high layer, the data packet is forwarded along the same level until a connecting node of the high layer network structure is found. If a target address of the data packet is equal to a high-level address of a local port, but the address of this layer is different, according to a random address mark of this layer, the data packet is sent along an address increasing or decreasing direction of this layer until a local match is found. If the addresses of the high level and this layer of the data packet are equal to the local port, but the addresses of the low layer are different, the data packet is forwarded to the low layer by bridging. If the node is not directly connected to the low layer, the data packet is forwarded along the same level until the connecting node of the low layer network is found. The embodiments of the present application also provide a task processing apparatus applied to a network topology, wherein the network topology includes a plurality of nodes. As shown in FIG. 9, the task processing apparatus 400 includes:

a first acquisition module 401 configured for acquiring target data and target algorithm required by a target task to be executed;

a second acquisition module 402 configured for acquiring from the network topology at least one first-type node capable of providing the target data and at least one second-type node capable of executing the target algorithm;

a selection module 403 configured for selecting, from the at least one first-type node, a node that provides one set of target data as a first target node, and selecting, from the at least one second-type node, a node that provides one set of target algorithm as a second target node; and a control module 404 configured for controlling the second target node to process a received first data packet of the target data sent by the first target node by using the target algorithm.

Optionally, the selection module 403 includes:

a combination submodule configured for acquiring a combination formed by the node that provides one set of target data and the node that provides one set of target algorithm; and a selection submodule configured for selecting one target combination according to capability information of each combination, determining the node that provides one set of target data in the target combination as the first target node, and determining the node that provides one set of target algorithm in the target combination as the second target node;

wherein, the capability information of the combination includes at least one of a time delay from the node that provides one set of target data to the node that provides one set of target algorithm in the combination, a duration required for the node that provides one set of target algorithm to execute the target algorithm, and a cache space size of the node that provides one set of target algorithm.

Optionally, the selection submodule is specifically configured for:

selecting a combination corresponding to a minimum value of the time delay from the node that provides one set of target data to the node that provides one set of target algorithm in the combination as the target combination;

or, selecting a combination corresponding to a minimum value of the duration required for the node that provides one set of target algorithm to execute the target algorithm in the combination as the target combination;

or, selecting a combination corresponding to a maximum value of the cache space of the node that provides one set of target algorithm in the combination as the target combination;

or, selecting a combination corresponding to a minimum value of a sum of the time delay from the node that provides one set of target data to the node that provides one set of target algorithm in the combination and the duration required for the node that provides one set of target algorithm to execute the target algorithm in the combination as the target combination;

or, selecting a combination corresponding to a minimum value of a first ratio in the combination as the target combination, wherein the first ratio is a ratio of the time delay from the node that provides one set of target data to the node that provides one set of target algorithm in the combination to a value of the cache space size of the node that provides one set of target algorithm in the combination;

or, selecting a combination corresponding to a minimum value of a second ratio in the combination as the target combination, wherein the second ratio is a ratio of the duration required for the node that provides one set of target algorithm to execute the target algorithm to the value of the cache space size of the node that provides one set of target algorithm in the combination.

Optionally, the task processing apparatus further includes:

a splitting module configured for, according to capability information of the nodes in the network topology, splitting the task to be executed into at least one subtask, and determining one subtask thereof as the target task.

Optionally, when that the target data includes a video stream or an audio stream, the control module includes:

a first processing submodule configured for controlling the second target node to process a received first data packet of the target data sent by the first target node by using the target algorithm;

wherein, the first data packet includes a video stream or an audio stream with a preset duration.

Optionally, the task processing apparatus further includes:

a processing module configured for, in the process of receiving the processed first data packet sent by the second target node, controlling the second target node to process a received second data packet of the target data sent by the first target node by using the target algorithm;

wherein, the second data packet includes a video stream or an audio stream with a preset duration.

Optionally, the control module includes:

a first sending submodule configured for sending first instruction information to the first target node, wherein the first instruction information is used for instructing the first target node to send the target data to the second target node;

a second sending submodule configured for sending second instruction information to the second target node, wherein the second instruction information is used for instructing the second target node to process the target data by using the target algorithm; and a receiving submodule configured for receiving the data sent by the second target node acquired after processing the target data by using the target algorithm.

As can be seen from the above, according to the task processing apparatus provided by the embodiments of the present application, by acquiring the target data and the target algorithm required by the target task to be executed, and determining the at least one first-type node capable of providing the target data and the at least one second-type node capable of executing the target algorithm in the network topology, one first-type node and one second-type node are selected, and the selected second-type node is controlled to process the target data provided by the selected first-type node by using the target algorithm, so as to execute the target task. It follows that, according to the embodiments of the present application, the data and the algorithm are distributed to the network respectively, instead of uniformly storing the data to the node that needs to perform the target task, or executing the target algorithm by the node that needs to execute the target algorithm, but are distributed to the node with the processing capability of the target algorithm to execute, that is, the embodiments of the present application combine distributed storage with distributed computing, which can reduce the capability of a single node in the network topology, thereby reducing the design cost of the single node and further reducing the design cost of the whole network topology.

Figure 10:
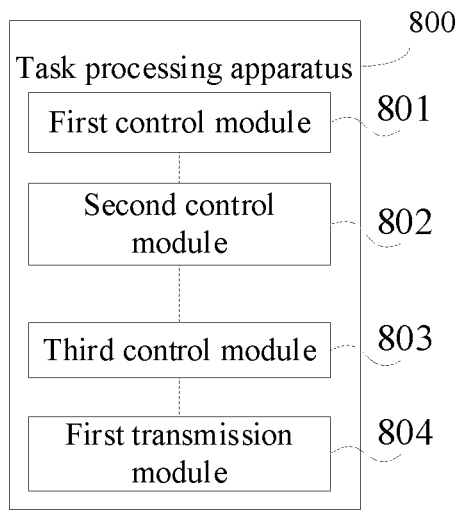
FIG. 10 is a structural block diagram of another task processing apparatus provided by an embodiment of the present application.

The embodiments of the present application also provide a task processing apparatus applied to a network topology, wherein the network topology includes: at least one layer of network structure, wherein each layer of network structure includes a plurality of nodes connected in a predetermined way. As shown in FIG. 10, the task processing apparatus 800 includes:

a first control module 801 configured for controlling a first-layer network structure to address, according to a first correlation parameter of a target content required by the first node, the second node capable of providing the target content in the first-layer network structure; wherein the first node is located in the first-layer network structure, and the second node is the first-type node or the second-type node;

a second control module 802 configured for, when the first-layer network structure fails to address the second node in the first-layer network structure, controlling the first-layer network structure to forward the first correlation parameter to the second-layer network structure;

a third control module 803 configured for controlling the first-layer network structure to receive an address of the second node sent by the second-layer network structure, wherein the address of the second node is obtained after the second-layer network structure addresses the second node in the second-layer network structure according to the first correlation parameter; and a first transmission module 804 configured for controlling the first node of the first-layer network structure to send a second correlation parameter of the target content to the second node according to the address of the second node.

Optionally, the first control module 801 is specifically configured for:

controlling the first node of the first-layer network structure to broadcast the first correlation parameter in the first-layer network structure.

Optionally, the second control module 802 is specifically configured for:

controlling the first node of the first-layer network structure to send instruction information to a third node of the first-layer network structure when not receiving the address of the second node within a preset time period after broadcasting the first correlation parameter; and controlling the third node of the first-layer network structure to forward the first correlation parameter to the fourth node of the second-layer network structure according to the instruction information wherein, the third node is connected with the fourth node.

Optionally, the third control module 803 is specifically configured for:

controlling the third node of the first-layer network structure to receive the address of the second node sent by the fourth node of the second-layer network structure; wherein the address of the second node sent by the fourth node is received from the second node after the fourth node broadcasts the first correlation parameter in the second-layer network structure; and controlling the first node of the first-layer network structure to receive the address of the second node sent by the third node of the first-layer network structure; wherein the address of the second node sent by the third node is sent to the third node by the fourth node.

Optionally, the task processing apparatus 800 further includes:

a second transmission module configured for controlling the first node of the first-layer network structure to receive the address of the second node sent by the second node of the first-layer network structure Optionally, a first control node is set in the first-layer network structure, and the first control node stores capability information of the nodes in the first-layer network structure; and the first control module 801 is specifically configured for:

controlling the first node of the first-layer network structure to send the first correlation parameter to the first control node of the first-layer network structure; and controlling the first control node of the first-layer network structure to address the second node according to the first correlation parameter and the capability information of the nodes in the first-layer network structure.

Optionally, a second control node is set in the second-layer network structure, and the second control node stores capability information of the nodes in the second-layer network structure; and the second control module 802 is specifically configured for:

when the first-layer network structure fails to address the second node in the first-layer network structure, controlling the first-layer network structure to forward the first correlation parameter to the second-layer network structure, including:

when the first control node of the first-layer network structure determines that the second node does not exist in the first-layer network structure according to the first correlation parameter and the capability information of the nodes in the first-layer network structure, controlling the first control node of the first-layer network structure to send the first correlation parameter to the second control node of the second-layer network structure.

Optionally, the third control module 803 is specifically configured for:

controlling the first control node of the first-layer network structure to receive the address of the second node sent by the second control node of the second-layer network structure, wherein the address of the second node sent by the second control node is determined by the second control node according to the first correlation parameter and the capability information of the nodes in the second-layer network structure; and controlling the first node of the first-layer network structure to receive the address of the second node sent by the first control node of the first-layer network structure.

Optionally, the task processing apparatus 800 further includes:

a third transmission module configured for controlling the first node of the first-layer network structure to receive the address of the second node of the first-layer network structure sent by the first control node of the first-layer network structure;

wherein, the address of the second node sent by the first control node is determined by the first control node according to the first correlation parameter and the capability information of the nodes in the first-layer network structure.

Optionally, the first transmission module 804 is specifically configured for:

controlling the first node to send the second correlation parameter to the third node through a path from the first node to the third node in the first-layer network structure;

wherein, after receiving the second correlation parameter, the third node forwards the second correlation parameter to the fourth node of the second-layer network structure, such that the fourth node forwards the second correlation parameter to the second node through a path from the fourth node to the second node in the second-layer network structure.

Optionally, the first transmission module 804 is specifically configured for:

controlling the first node to send the second correlation parameter to the first node through a path to the first control node;

wherein, after receiving the second correlation parameter, the first control node forwards the second correlation parameter to the second control node of the second-layer network structure, such that the second control node forwards the second correlation parameter to the second node through a path to the second node.

Optionally, the first transmission module 804 is specifically configured for:

controlling the first node to send the second correlation parameter to the second node through a path from the first node to the second node in the first-layer network structure.

Optionally, the first transmission module 804 is specifically configured for:

controlling the first node to send the second correlation parameter to the first node through a path to the first control node;

wherein, after receiving the second correlation parameter, the first control node sends the second correlation parameter to the second node through a path to the second node.

It can be seen from the above that the task processing apparatus provided by the embodiment of the present application addresses the content of the second node that can provide the target content according to the first correlation parameter of the target content required by the first node in the first-layer network structure where the first node is located, and directly forwards the first correlation parameter to the second-layer network structure when the second node is not addressed in the first-layer network structure, so as to address the second node again in the second-layer network structure until the second node is found, then the first node sends the second correlation parameter of the target content to the second node according to the address of the second node. Therefore, it can be seen that, in the task processing method of the embodiment of the present application, in the process of addressing the second node, only the content is addressed in the layer, and the parameter on which the addressing is based is directly forwarded between the layers, so that the content addressing range is shortened, the overhead is reduced, and the security requirements are met to some extent through the content addressing mode.

Figure 11:
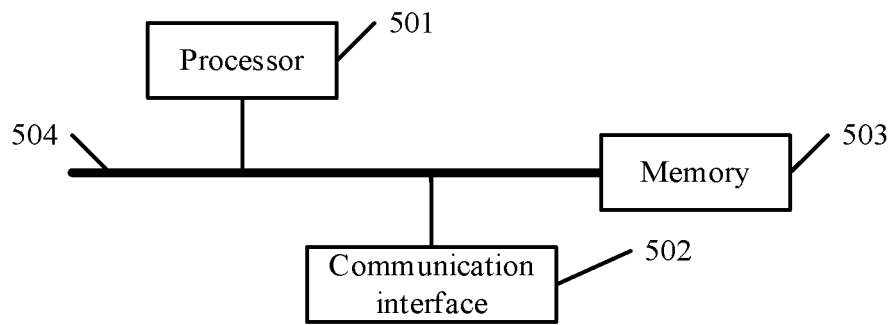
FIG. 11 is a structural block diagram of an electronic device provided by an embodiment of the present application.

The embodiments of the present application also provide an electronic device, as shown in FIG. 11, which includes a processor 501, a communication interface 502, a memory 503 and a communication bus 504, wherein the processor 501, the communication interface 502 and the memory 503 communicate with each other through the communication bus 504;

the memory 503 is configured for storing a computer program; and the processor 501 is configured for implementing the steps in the task processing method described below when executing the program stored in the memory 503; and the communication interface 502 is configured for communication between the terminal above and other devices.

The task processing method is applied to a network topology, and the network topology includes a plurality of nodes. The task processing method includes:

acquiring target data and target algorithm required by a target task to be executed;

acquiring from the network topology at least one first-type node capable of providing the target data and at least one second-type node capable of executing the target algorithm;

selecting, from the at least one first-type node, a node that provides one set of target data as a first target node, and selecting, from the at least one second-type node, a node that provides one set of target algorithm as a second target node; and controlling the second target node to process the target data in the first target node by using the target algorithm.

selecting the node that provides one set of target data as the first target node from the at least one first-type node, and selecting the node that provides one set of target algorithm as the second target node from the at least one second-type node, includes:

acquiring a combination formed by the node that provides one set of target data and the node that provides one set of target algorithm; and selecting one target combination according to capability information of each combination, determining the node that provides one set of target data in the target combination as the first target node, and determining the node that provides one set of target algorithm in the target combination as the second target node;

wherein, the capability information of the combination includes at least one of a time delay from the node that provides one set of target data to the node that provides one set of target algorithm in the combination, a duration required for the node that provides one set of target algorithm to execute the target algorithm, and a cache space size of the node that provides one set of target algorithm.

Optionally, the step of, selecting one target combination according to the capability information of each combination, includes:

selecting a combination corresponding to a minimum value of the time delay from the node that provides one set of target data to the node that provides one set of target algorithm in the combination as the target combination;

or, selecting a combination corresponding to a minimum value of the duration required for the node that provides one set of target algorithm to execute the target algorithm in the combination as the target combination;

or, selecting a combination corresponding to a maximum value of the cache space of the node that provides one set of target algorithm in the combination as the target combination;

or, selecting a combination corresponding to a minimum value of a sum of the time delay from the node that provides one set of target data to the node that provides one set of target algorithm in the combination and the duration required for the node that provides one set of target algorithm to execute the target algorithm in the combination as the target combination;

or, selecting a combination corresponding to a minimum value of a first ratio in the combination as the target combination, wherein the first ratio is a ratio of the time delay from the node that provides one set of target data to the node that provides one set of target algorithm in the combination to a value of the cache space size of the node that provides one set of target algorithm in the combination;

or, selecting a combination corresponding to a minimum value of a second ratio in the combination as the target combination, wherein the second ratio is a ratio of the duration required for the node that provides one set of target algorithm to execute the target algorithm to the value of the cache space size of the node that provides one set of target algorithm in the combination.

Optionally, before the step of, acquiring the target data and the target algorithm required by the target task to be executed, the method further includes:

according to capability information of the nodes in the network topology, splitting the task to be executed into at least one subtask, and determining one subtask thereof as the target task.

Optionally, when that the target data includes a video stream or an audio stream, the step of, controlling the second target node to process the target data in the first target node by using the target algorithm, includes:

controlling the second target node to process a received first data packet of the target data sent by the first target node by using the target algorithm;

wherein, the first data packet includes a video stream or an audio stream with a preset duration.

Optionally, after the step of, controlling the second target node to process the received first data packet of the target data sent by the first target node by using the target algorithm, the method further includes:

in the process of receiving the processed first data packet sent by the second target node, controlling the second target node to process a received second data packet of the target data sent by the first target node by using the target algorithm;

wherein, the second data packet includes a video stream or an audio stream with a preset duration.

Optionally, the step of, controlling the second target node to process the target data in the first target node by using the target algorithm, includes:

sending first instruction information to the first target node, wherein the first instruction information is used for instructing the first target node to send the target data to the second target node;

sending second instruction information to the second target node, wherein the second instruction information is used for instructing the second target node to process the target data by using the target algorithm; and receiving the data sent by the second target node acquired after processing the target data by using the target algorithm.

Optionally, the network topology includes: at least one layer of network structure, wherein each layer of network structure includes a plurality of nodes connected in a predetermined way. The task processing method further includes:

according to a first correlation parameter of a target content required by the first node, addressing, by a first-layer network structure, the second node capable of providing the target content in the first-layer network structure; wherein the first node is located in the first-layer network structure, and the second node is the first-type node or the second-type node;

when the first-layer network structure fails to address the second node in the first-layer network structure, forwarding the first correlation parameter to a second-layer network structure by the first-layer network structure;

receiving an address of the second node sent by the second-layer network structure by the first-layer network structure, wherein the address of the second node is obtained after the second-layer network structure addresses the second node in the second-layer network structure according to the first correlation parameter; and sending a second correlation parameter of the target content to the second node according to the address of the second node by the first node of the first-layer network structure.

Optionally, according to the first correlation parameter of the target content required by the first node, addressing the second node capable of providing the target content in the first-layer network structure by the first-layer network structure, includes:

broadcasting the first correlation parameter in the first-layer network structure by the first node of the first-layer network structure.

Optionally, when the first-layer network structure fails to address the second node in the first-layer network structure, forwarding the first correlation parameter to the second-layer network structure by the first-layer network structure, includes:

when the first node of the first-layer network structure does not receive the address of the second node within a preset time period after broadcasting the first correlation parameter, sending instruction information to a third node of the first-layer network structure; and forwarding the first correlation parameter to the fourth node of the second-layer network structure according to the instruction information by the third node of the first-layer network structure.

wherein, the third node is connected with the fourth node.

Optionally, receiving the address of the second node sent by the second-layer network structure by the first-layer network structure, includes:

receiving the address of the second node sent by the fourth node of the second-layer network structure by the third node of the first-layer network structure; wherein the address of the second node sent by the fourth node is received from the second node after the fourth node broadcasts the first correlation parameter in the second-layer network structure; and receiving the address of the second node sent by the third node of the first-layer network structure by the first node of the first-layer network structure; wherein the address of the second node sent by the third node is sent to the third node by the fourth node.

Optionally, the task processing method further includes:

receiving the address of the second node sent by the second node of the first-layer network structure by the first node of the first-layer network structure.

Optionally, a first control node is set in the first-layer network structure, and the first control node stores capability information of the nodes in the first-layer network structure; and according to the first correlation parameter of the target content required by the first node, addressing the second node capable of providing the target content in the first-layer network structure by the first-layer network structure, includes:

sending the first correlation parameter to the first control node of the first-layer network structure by the first node of the first-layer network structure; and according to the first correlation parameter and the capability information of the nodes in the first-layer network structure, addressing the second node by the first control node of the first-layer network structure.

Optionally, a second control node is set in the second-layer network structure, and the second control node stores capability information of the nodes in the second-layer network structure; and when the first-layer network structure fails to address the second node in the first-layer network structure, forwarding the first correlation parameter to the second-layer network structure by the first-layer network structure, includes:

when the first control node of the first-layer network structure determines that the second node does not exist in the first-layer network structure according to the first correlation parameter and the capability information of the nodes in the first-layer network structure, sending the first correlation parameter to the second control node of the second-layer network structure by first control node of the first-layer network structure.

Optionally, receiving the address of the second node sent by the second-layer network structure by the first-layer network structure, includes:

receiving the address of the second node sent by the second control node of the second-layer network structure by the first control node of the first-layer network structure, wherein the address of the second node sent by the second control node is determined by the second control node according to the first correlation parameter and the capability information of the nodes in the second-layer network structure; and receiving the address of the second node sent by the first control node of the first-layer network structure by the first node of the first-layer network structure.

Optionally, the task processing method further includes:

receiving the address of the second node of the first-layer network structure sent by the first control node of the first-layer network structure by the first node of the first-layer network structure;

wherein, the address of the second node sent by the first control node is determined by the first control node according to the first correlation parameter and the capability information of the nodes in the first-layer network structure.

Optionally, sending the second correlation parameter of the target content to the second node according to the address of the second node by the first node of the first-layer network structure, includes:

sending the second correlation parameter to the third node through a path from the first node to the third node in the first-layer network structure by the first node;

wherein, after receiving the second correlation parameter, the third node forwards the second correlation parameter to the fourth node of the second-layer network structure, such that the fourth node forwards the second correlation parameter to the second node through a path from the fourth node to the second node in the second-layer network structure.

Optionally, sending the second correlation parameter of the target content to the second node according to the address of the second node by the first node of the first-layer network structure, includes:

sending the second correlation parameter to the first node through a path to the first control node by the first node;

wherein, after receiving the second correlation parameter, the first control node forwards the second correlation parameter to the second control node of the second-layer network structure, such that the second control node forwards the second correlation parameter to the second node through a path to the second node.

Optionally, sending the second correlation parameter of the target content to the second node according to the address of the second node by the first node of the first-layer network structure, includes:

sending the second correlation parameter to the second node through a path from the first node to the second node in the first-layer network structure by the first node.

Optionally, sending the second correlation parameter of the target content to the second node according to the address of the second node by the first node of the first-layer network structure, includes:

sending the second correlation parameter to the first node through a path to the first control node by the first node;

wherein, after receiving the second correlation parameter, the first control node sends the second correlation parameter to the second node through a path to the second node.

The communication bus mentioned by the terminal above may be a Peripheral Component Interconnect (referred to as PCI) bus or an Extended Industry Standard Architecture (referred to as EISA) bus. The communication bus may be divided into an address bus, a data bus, a control bus, and the like. For convenience of illustration, the bus is represented by one thick line only in the figure, but it does not mean that there is only one bus or one type of bus.

Figure 12:
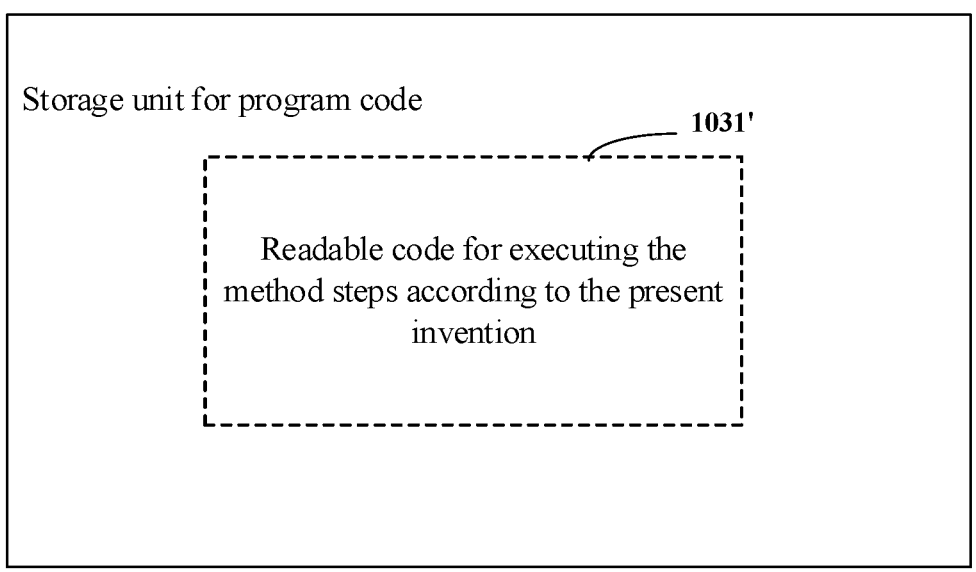
FIG. 12 schematically shows a storage unit for holding or carrying a program code for implementing the method according to the present application.

The memory may include a Random Access Memory (referred to as RAM), and may also include a non-volatile memory, such as at least one disk memory. Optionally, the memory may also be at least one storage device disposed far from the forgoing processor. The memory has a storage space of a program code 1031 for implementing any steps of the above method. For example, the storage space for program code may contain program codes 1031 for individually implementing each of the steps of the above method. Those program codes may be read from one or more computer program products or be written into the one or more computer program products. These computer program products include program code carriers such as hard disks, compact disks (CD), memory cards, or floppy disks. Such computer program products are usually portable or fixed storage units as shown in FIG. 12. The storage unit may have storage segments or storage spaces with similar arrangement to the memory 503 of the electronic device in FIG. 11. The program codes may for example be compressed in a suitable form. Generally, the storage unit includes a computer-readable code, which can be read by a processor like 501. When those codes are executed by the electronic device, the codes cause the electronic device to implement each of the steps of the method described above.

The above-mentioned processor may be a general-purpose processor, including a Central Processing Unit (referred to as CPU), a Network Processor (referred to as NP); and may also be a Digital Signal Processor (referred to as DSP), an Application Specific Integrated Circuit (referred to as ASIC), a Field-Programmable Gate Array (referred to as FPGA) or other programmable logic device, a discrete gate, or a transistor logic device, and a discrete hardware assembly.

In yet another embodiment provided by the present application, a computer-readable storage medium is further provided. The computer-readable storage medium stores an instruction that, when running on a computer, enables the computer to execute the task processing method described in any of the above embodiments.

In the above-mentioned embodiments, it may be realized in whole or in part by software, hardware, firmware or any combination thereof. When it is implemented using software, it may be implemented in whole or in part in the form of a computer program product. The computer program product includes one or more computer instructions. When the computer program instructions are loaded and executed on a computer, the processes or functions according to the embodiments of the present application are generated in whole or in part. The computer may be a general-purpose computer, a special purpose computer, a computer network, or other programmable apparatus. The computer instruction may be stored in a computer-readable storage medium or transmitted from one computer-readable storage medium to another computer-readable storage medium, for example, the computer instruction may be transmitted from one website site, computer, server or data center to another website site, computer, server or data center by wired (e.g., coaxial cable, optical fiber, Digital Subscriber Line (DSL)) or wireless (e.g., infrared, wireless, microwave, etc.) manners. The computer-readable storage medium may be any available medium that a computer can access or a data storage device such as a server, a data center, or the like that includes one or more available media integration. The available medium may be a magnetic medium (e.g., floppy disk, hard disk, magnetic tape), an optical medium (e.g., DVD), or semiconductor medium (e.g., Solid State Disk (SSD)) or the like.

It should be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, a method, an article, or a device including a series of elements, includes not only those elements but also includes other elements not expressly listed, or also includes elements inherent to such process, method, article, or device. In the absence of further limitation, an element defined by the phrase "including a . . . " does not exclude the presence of the same element in the process, method, article, or device.

All the embodiments in this specification are described in relevant ways, the same and similar parts between the embodiments may be referred to each other, and each embodiment focuses on the differences from other embodiments. Particularly, as for the system embodiment, since it is basically similar to the method embodiment, the description of the device embodiment is relatively simple. For relevant points, please refer to the partial description of the method embodiment.

The above description is merely preferred embodiments of the present application, but is not intended to limit the protection scope of the present application. Any modifications, equivalent substitutions, and improvements made within the spirit and principle of the present application shall all fall within the scope of protection claimed by the present application.

The invention claimed is:

1. A task processing method, applied to a network topology, wherein the network topology comprises a plurality of nodes, and the task processing method comprises:

acquiring target data and target algorithm required by a target task to be executed;

acquiring at least one first-type node capable of providing the target data and at least one second-type node capable of executing the target algorithm from the network topology;

selecting a node that provides one set of the target data as a first target node from the at least one first-type node, and selecting a node that provides one set of the target algorithm as a second target node from the at least one second-type node;

controlling the second target node to process the target data in the first target node by using the target algorithm;

wherein selecting the node that provides one set of the target data as the first target node from the at least one first-type node, and selecting the node that provides one set of the target algorithm as the second target node from the at least one second-type node comprising:

acquiring a combination formed by the node that provides one set of the target data and the node that provides one set of the target algorithm;

selecting one target combination according to capability information of each combination, determining the node that provides one set of the target data in the target combination as the first target node, and determining the node that provides one set of the target algorithm in the target combination as the second target node;

wherein, the capability information of the combination comprises at least one of a time delay from the node that provides one set of the target data to the node that provides one set of the target algorithm in the combination;

or, the capability information of the combination comprises at least one of a time delay from the node that provides one set of the target data to the node that provides one set of the target algorithm in the combination, and a duration required for the node that provides one set of the target algorithm to execute the target algorithm;

or, the capability information of the combination comprises at least one of a time delay from the node that provides one set of the target data to the node that provides one set of the target algorithm in the combination, and a cache space size of the node that provides one set of the target algorithm.

2. The task processing method according to claim 1, wherein selecting one target combination according to the capability information of each combination, comprises:

selecting a combination corresponding to a minimum value of the time delay from the node that provides one set of the target data to the node that provides one set of the target algorithm in the combination as the target combination;

or, selecting a combination corresponding to a minimum value of a sum of the time delay from the node that provides one set of the target data to the node that provides one set of the target algorithm in the combination and the duration required for the node that provides one set of the target algorithm to execute the target algorithm in the combination as the target combination;

or, selecting a combination corresponding to a minimum value of a first ratio in the combination as the target combination, wherein the first ratio is a ratio of the time delay from the node that provides one set of the target data to the node that provides one set of the target algorithm in the combination to a value of the cache space size of the node that provides one set of the target algorithm in the combination.

3. The task processing method according to claim 1, wherein before acquiring the target data and the target algorithm required by the target task to be executed, the method further comprises:

according to capability information of the nodes in the network topology, splitting the task to be executed into at least one subtask, and determining one subtask thereof as the target task.

4. The task processing method according to claim 1, wherein when the target data comprises a video stream or an audio stream, controlling the second target node to process the target data in the first target node by using the target algorithm, comprises:

controlling the second target node to process a received first data packet of the target data sent by the first target node by using the target algorithm;

wherein, the first data packet comprises a video stream or an audio stream with a preset duration.

5. The task processing method according to claim 4, wherein after controlling the second target node to process the received first data packet of the target data sent by the first target node by using the target algorithm, the method further comprises:

in the process of receiving the processed first data packet sent by the second target node, controlling the second target node to process a received second data packet of the target data sent by the first target node by using the target algorithm;

wherein, the second data packet comprises a video stream or an audio stream with a preset duration.

6. The task processing method according to claim 1, wherein controlling the second target node to process the target data in the first target node by using the target algorithm, comprises:

sending first instruction information to the first target node, wherein the first instruction information is configured for instructing the first target node to send the target data to the second target node;

sending second instruction information to the second target node, wherein the second instruction information is configured for instructing the second target node to process the target data by using the target algorithm; and receiving the data sent by the second target node acquired after processing the target data by using the target algorithm.

7. An electronic device comprising a processor, a memory, and a computer program stored in the memory and executable on the processor, wherein the computer program, when executed by the processor, implements the steps of the task processing method according to claim 1.

8. A non-transitory computer-readable storage medium stores a computer program, wherein the computer program, when executed by a processor, implements the task processing method according to claim 1.

* * * * *

UNITED STATES PATENT AND TRADEMARK OFFICE
CERTIFICATE OF CORRECTION

PATENT NO. : 11,706,097 B2
APPLICATION NO. : 17/794457
DATED : July 18, 2023
INVENTOR(S) : Yushi Shen et al.

It is certified that error appears in the above-identified patent and that said Letters Patent is hereby corrected as shown below:

On the Title Page

Item (72)
The city of residence of all the inventors is Beijing (CN).

Signed and Sealed this
Fourteenth Day of November, 2023

Katherine Kelly Vidal
*Director of the United States Patent and Trademark Office*